US011102369B2

(12) United States Patent
Matsunaga et al.

(10) Patent No.: US 11,102,369 B2
(45) Date of Patent: Aug. 24, 2021

(54) IMAGE READING DEVICE

(71) Applicant: Mitsubishi Electric Corporation, Tokyo (JP)

(72) Inventors: Hiroaki Matsunaga, Tokyo (JP); Daisuke Ohama, Tokyo (JP); Yuki Okuhigashi, Tokyo (JP); Masahiko Takashina, Tokyo (JP); Shigeru Matsuo, Tokyo (JP); Masaki Wakisaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/264,854

(22) PCT Filed: Sep. 4, 2019

(86) PCT No.: PCT/JP2019/034721
§ 371 (c)(1),
(2) Date: Feb. 1, 2021

(87) PCT Pub. No.: WO2020/050300
PCT Pub. Date: Mar. 12, 2020

(65) Prior Publication Data
US 2021/0218861 A1    Jul. 15, 2021

(30) Foreign Application Priority Data

Sep. 5, 2018  (JP) .............................. JP2018-165610

(51) Int. Cl.
*H04N 1/04*      (2006.01)
*H04N 1/028*     (2006.01)

(52) U.S. Cl.
CPC ..... *H04N 1/02835* (2013.01); *H04N 1/02895* (2013.01); *H04N 2201/03112* (2013.01);
(Continued)

(58) Field of Classification Search
CPC ........... H04N 1/02835; H04N 1/02895; H04N 2201/03112; H04N 2201/03116; H04N 2201/03125
(Continued)

(56) References Cited

U.S. PATENT DOCUMENTS 9,273,848 B2 *    3/2016  Aramaki ............ H04N 1/02835
2011/0273750 A1 * 11/2011  Wilsher ............. H04N 1/02895
                                                         358/475
(Continued)

FOREIGN PATENT DOCUMENTS

JP    2007-86598 A    4/2007
JP    2012-199983 A   10/2012
(Continued)

OTHER PUBLICATIONS

International Search Report and Written Opinion dated Nov. 26, 2019, received for PCT Application PCT/JP2019/034721, Filed on Sep. 4, 2019, 6 pages including English Translation.
(Continued)

*Primary Examiner* — Cheukfan Lee
(74) *Attorney, Agent, or Firm* — Xsensus LLP (57) ABSTRACT

An image reading device includes (i) light guides extending in a main scanning direction and configured to emit light from a light source toward a reading target moving relatively in a sub-scanning direction, the light from the light source being projected into end surfaces of the light guides in the main scanning direction, (ii) an optical filter arranged between the light source and the end surfaces of the light guides and configured to block or attenuate light having a specific wavelength from the light from the light source, (iii) a lens body to focus reflected light reflected by the reading target onto a light receiver to convert the reflected light into an electrical signal, and (iv) a lens holder. The lens holder
(Continued)

includes a first positioner for positioning the light guides and a second positioner for positioning the optical filter.

12 Claims, 8 Drawing Sheets

(52) U.S. Cl.
CPC .............. *H04N 2201/03116* (2013.01); *H04N 2201/03125* (2013.01)

(58) Field of Classification Search
USPC .......................... 358/482, 483, 484, 474, 475
See application file for complete search history.

(56) References Cited

U.S. PATENT DOCUMENTS

| | | |
|---|---|---|
| 2012/0318961 A1 | 12/2012 | Sawada |
| 2014/0253982 A1* | 9/2014 | Mitsutake ................. F21V 9/04 358/475 |
| 2015/0319329 A1* | 11/2015 | Matsuzawa ............ H04N 1/028 358/475 |
| 2016/0234445 A1* | 8/2016 | Shimoda ................ H04N 5/332 |
| 2018/0096553 A1* | 4/2018 | Horiguchi ................ G02B 5/22 |
| 2019/0349495 A1* | 11/2019 | Matsuzawa ............ H04N 1/028 |
| 2019/0379801 A1* | 12/2019 | Matsuzawa ............ G03B 27/54 |
| 2020/0244834 A1* | 7/2020 | Bogaki ................. G01J 1/0488 |
| 2020/0344377 A1* | 10/2020 | Matsuzawa .......... G02B 5/0278 |

FOREIGN PATENT DOCUMENTS

| | | |
|---|---|---|
| JP | 2013-78102 A | 4/2013 |
| JP | 2016-5130 A | 1/2016 |
| WO | 2014/129549 A1 | 8/2014 |

OTHER PUBLICATIONS

Notice of Reasons for Refusal dated May 12, 2020, received for JP Application 2020-505502, 4 pages including English Translation.
Decision to Grant dated Jun. 9, 2020, received for JP Application 2020-505502, 5 pages including English Translation.

\* cited by examiner

IMAGE READING DEVICE

CROSS-REFERENCE TO RELATED APPLICATIONS

The present application is based on PCT filing PCT/JP2019/034721, filed Sep. 4, 2019, which claims priority to JP 2018-165610, filed Sep. 5, 2018, the entire contents of each are incorporated herein by reference.

TECHNICAL FIELD

The present disclosure relates to an image reading device for reading an image of a document and used in a copier, a digital multifunctional printer or the like.

BACKGROUND ART

An image reading device, using a light receiver arranged along a main scanning direction, receives reflected light from a reading target moving relatively in a sub-scanning direction, to obtain an image of the reading target. Due to increase in resolution of a copier, a scanner or the like and demand for uniformity of reading depth, optical systems used in image reading devices are required to have a configuration that enables irradiation of light that is uniform in a longitudinal direction that is a main scanning direction and regulates relative positions of a document, a lens body and a light receiver with high accuracy. For example, the image reading device disclosed in Patent Literature 1 includes an illumination unit that irradiates light onto a reading target and an imaging unit that focuses reflected light from the reading target.

The illumination unit includes light guides that emit light while guiding light in a main scanning direction, light sources that are arranged to face end surfaces of the light guides in a longitudinal direction corresponding to the main scanning direction and emit light, light guide holders that hold ends of the light guides, a housing that is a sheet metal member that accommodates each component included in the illumination unit, and light shielding materials that fix the light guide holders to the housing and have light shielding properties.

Furthermore, optical filters that each are an optical component for filtering out light having a specific wavelength, such as an infrared cut filter (IRCF), are disposed between the end surfaces of the light guides in the longitudinal direction corresponding to the main scanning direction and the light sources facing the end surfaces. These optical filters are fixed to the light guide holders using, for example, double-faced adhesive tape or an adhesive.

In this respect, in an image reading device that includes an optical filter as disclosed in Patent Literature 1, highly accurate determination is important for a position of the optical filter bonded to light guide holders with respect to light guides.

According to the imaging apparatus disclosed in Patent Literature 2, in which an optical filter is bonded using an adhesive, an adhesive reservoir groove is disposed in a bonding portion, in order to effectively prevent intrusion of the adhesive into a path through which light passes, that is, a region reached by light passing through a lens portion.

CITATION LIST

Patent Literature

Patent Literature 1: International Publication No. WO 2014/129549

Patent Literature 2: Unexamined Japanese Patent Application Publication No. 2007-86598

SUMMARY OF INVENTION

Technical Problem

Although Patent Literature 1 discloses bonding and fixing the optical filters to the light guide holders, Patent Literature 1 does not disclose a configuration to highly accurately maintain a relative positional relationship between the light guides that irradiate light onto a document and the optical filters that filter out light having a specific wavelength. This causes a problem in that variance in positions of the light guides and the optical filters leads to deterioration in quality of an image obtained by using the image reading device.

Furthermore, although Patent Literature 2 discloses that the adhesive reservoir groove, during fixing of the optical filters, effectively prevents invasion of the adhesive into the path through which light passes, that is, the region reached by light passing through the lens portion, Patent Literature 2 does not disclose features relating to a shape of the adhesive reservoir groove, such as a depth and a width of the adhesive reservoir groove. Thus, application of a large amount of the adhesive may lead to squeezing out of the adhesive from the adhesive reservoir groove, thereby causing a problem in that the adhesive flowing into the region traversed by light through the lens portion causes deterioration in quality of an image obtained by using the image reading device.

The present disclosure is made to solve the aforementioned problems, and thus a first objective of the present disclosure is, for achievement of an image reading device by which a high quality image is obtained, to highly accurately maintain a relative positional relationship between a light guide and an optical filter, and a second objective of the present disclosure is, for achievement of an image reading device by which a high quality image is obtained, to prevent flow of an adhesive toward the light guide during bonding of the optical filter.

Solution to Problem

An image reading device according to the present disclosure includes (i) a light guide extending in a main scanning direction and configured to emit light from a light source toward a reading target moving relatively in a sub-scanning direction, the light from the light source being projected into an end surface of the light guide in the main scanning direction, (ii) an optical filter arranged between the light source and the end surface of the light guide in the main scanning direction and configured to block or attenuate light having a specific wavelength from the light from the light source, (iii) a lens body to focus reflected light reflected by the reading target onto a light receiver to convert the reflected light into an electrical signal, and (iv) a lens holder to hold the light guide, the optical filter, and the lens body. The lens holder includes (i) a first positioner for positioning the light guide in the sub-scanning direction and in a height direction that is orthogonal to the main scanning direction and the sub-scanning direction and (ii) a second positioner for positioning the optical filter in the height direction and the sub-scanning direction.

Advantageous Effects of Invention

According to the present disclosure, the light guide and the optical filter are positioned using the lens holder. This

DESCRIPTION OF EMBODIMENTS

Embodiment 1

Figure 1:
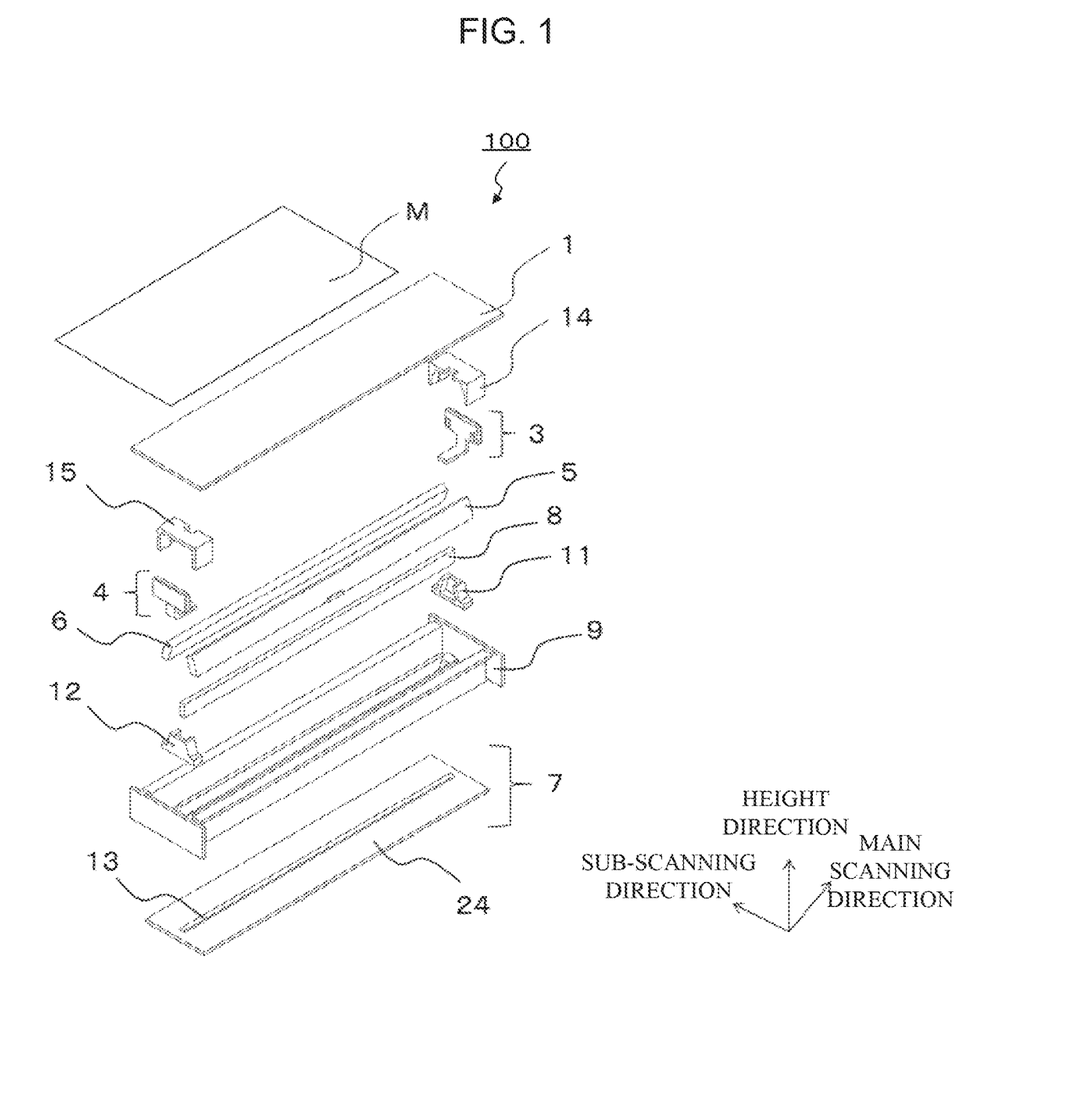
FIG. 1 is an exploded perspective view of an image reading device according to Embodiment 1 of the present disclosure.
Figure 2:
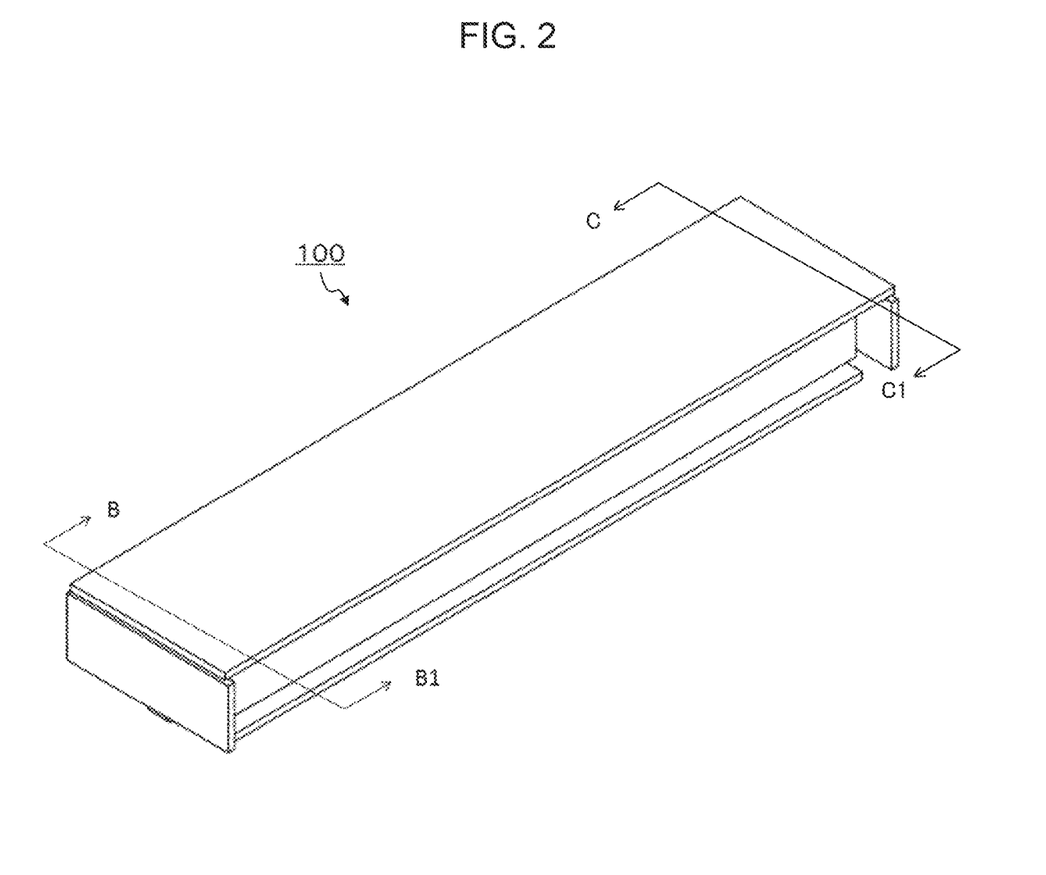
FIG. 2 is a perspective view of the image reading device according to Embodiment 1 of the present disclosure.

Embodiment 1 of the present disclosure is explained with reference to FIGS. 1-8. FIG. 1 is an exploded perspective view of an image reading device 100 according to Embodiment 1 of the present disclosure. FIG. 2 is a perspective view of the image reading device 100 according to Embodiment 1 of the present disclosure. The document M of FIG. 1 is a reading target of the image reading device 100 and is a medium to be scanned such as a banknote, a securities certificate, or another common document. The document M is in contact with a transparent plate 1 such that a reading surface of the document M faces the transparent plate 1. A non-illustrated conveying mechanism conveys the document M to the image reading device 100. The image reading device 100 reads an image of the document M in contact with the transparent plate 1. The document M may be kept stationary while moving the image reading device 100. A sub-scanning direction is a direction in which the document M moves relative to the image reading device 100, and a main scanning direction is a direction along which alight receiver 13 described later is arranged. For explanation of embodiments of the present disclosure, the main scanning direction, the sub-scanning direction, and a height direction that are illustrated in FIG. 1 are defined as follows: the main scanning direction is the longitudinal direction of the image reading device 100, the sub-scanning direction is the lateral direction of the image reading device 100, and the height direction is the direction of the normal line of the reading surface of the document M and also is the direction of the normal of the transparent plate 1. That is to say, the height direction is orthogonal to both the main scanning direction and the sub-scanning direction. In the explanation below, positions in the main scanning direction, the sub scanning direction and the height direction with respect to the center of the image reading device 100 are expressed as "inside" or "outside".

The image reading device 100 includes the transparent plate 1, light guides 5 and 6 that irradiate light onto the reading surface of the document M, a lens body 8 that condenses reflected light reflected by the reading surface of the document M, light source units 3 and 4 that each project light into a corresponding end surface of both end surfaces of the light guides 5 and 6 in the main scanning direction, and a sensor unit 7 that receives the light condensed by the lens body 8. The light guides 5 and 6 are made of, for example, resin or glass. The lens body 8 is, for example, rod lenses arranged in an array. Light guide holders 14 and 15 hold the light guides 5 and 6. Lens holders 11 and 12 hold the light guides 5 and 6, the lens body 8, and non-illustrated optical filters. Hereinafter, the term "light guide" is used to collectively refer to the light guides 5 and 6, and the term "lens holder" is used to collectively refer to the lens holders 11 and 12. The optical filter is described later in detail.

Figure 3A:
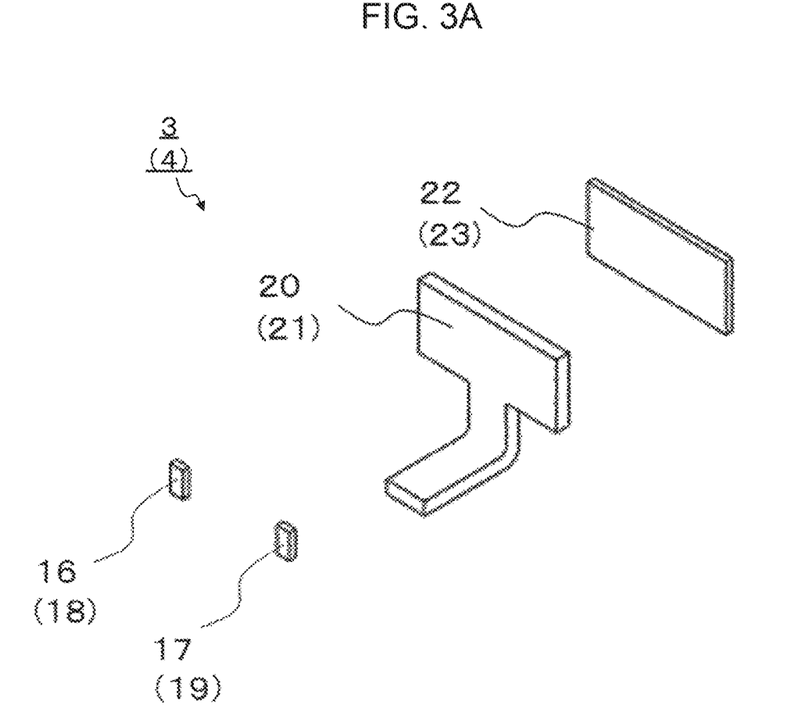
FIG. 3A is an exploded perspective view of light source units according to Embodiment 1 of the present disclosure.
Figure 3B:
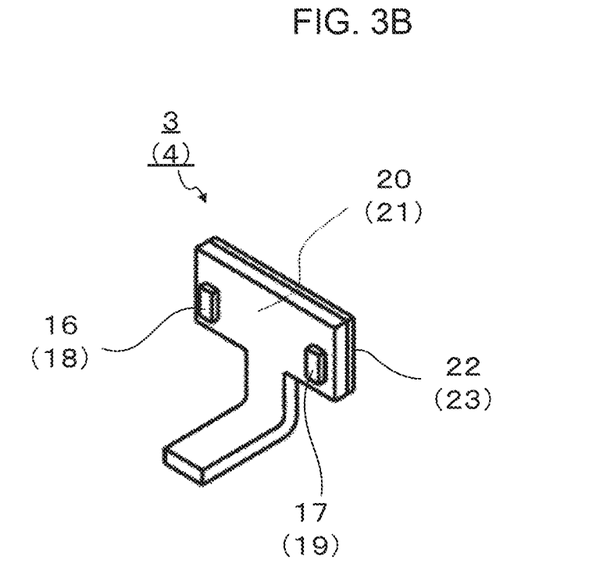
FIG. 3B is a perspective view of the light source unit according to Embodiment 1 of the present disclosure.

The light source units 3 and 4 are described with reference to FIGS. 3A and 3B. The light source units 3 and 4 are similarly configured. In the explanation below, reference signs of structural elements included in the light source unit 4 are indicated in parentheses. The light source unit 3 (4) includes light sources 16 (18) and 17 (19) that irradiate light into the light guide 5 and the light guide 6, a light source board 20 (21) on which are mounted the light source 16 (18) and the light source 17 (19), and a heat conductor 22 (23) that dissipates heat of the light source board 20 (21). The heat conductor 22 (23) is in close contact with a surface of the light source board 20 (21) opposite to the surface on which the light source 16 (18) and the light source 17 (19) are mounted. Hereinafter, the expression "light source" is used to collectively refer to the light source 16 (18) and the light source 17 (19). The light source is alight emitting element such as a light emitting diode (LED) device, an organic electroluminescent (EL) device, and the like. A light source that emits red light (R), green light (G), blue light (B), white light (W), ultraviolet light (UV), infrared light (IR), and other light in accordance with image information to be read is used as the light source.

Again with reference to FIG. 1, the sensor unit 7 includes a sensor board 24 and the light receiver 13 mounted on the sensor board 24. The lens body 8 focuses onto the light receiver 13 the reflected light reflected by the reading surface of the document M. The light receiver 13 performs photoelectric conversion of, and outputs as an electrical signal, the focused light. The image reading device 100 combines the electrical signals output by the light receiver 13, thereby obtaining an image of the reading surface of the document M. The light source units 3 and 4, the light guides 5 and 6, the light guide holders 14 and 15, the lens body 8, and the lens holders 11 and 12 are fixed to a housing 9.

Figure 4A:
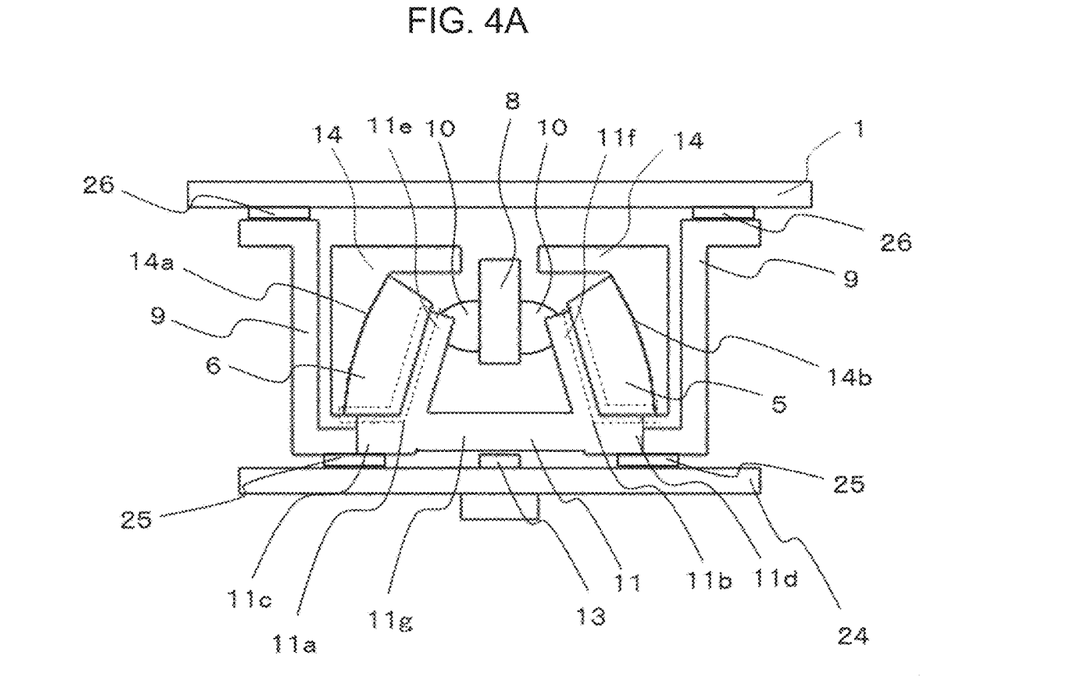
FIG. 4A is a cross-sectional view illustrating the image reading device according to Embodiment 1 of the present disclosure in a sub-scanning direction, taken along line B-B1 of FIG. 2.
Figure 4B:
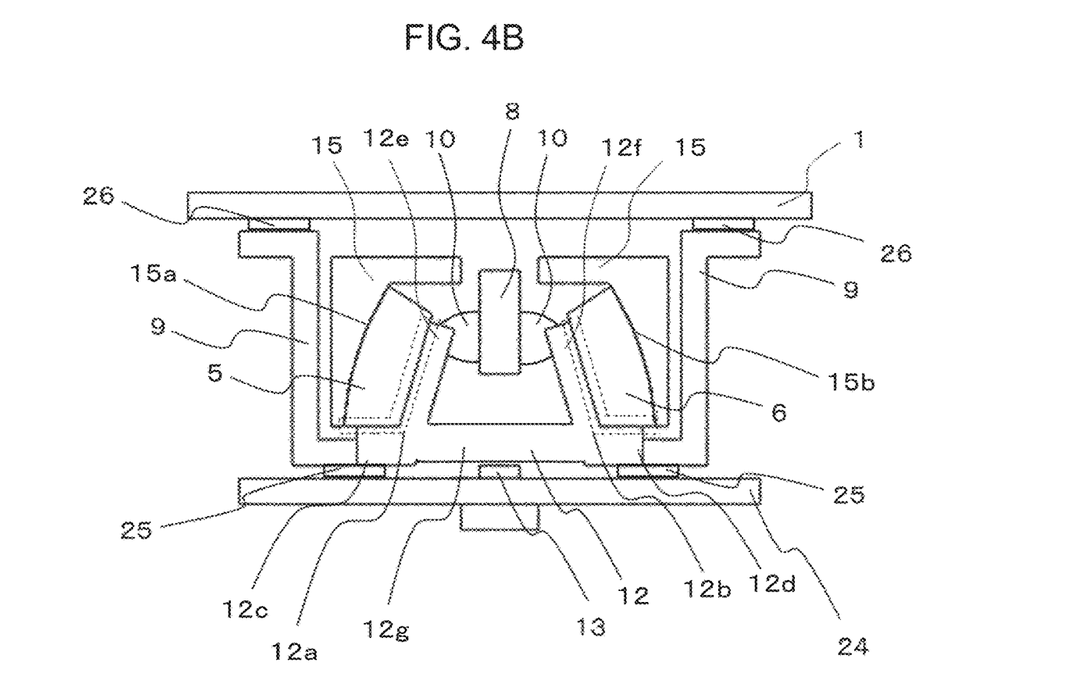
FIG. 4B is a cross-sectional view illustrating the image reading device according to Embodiment 1 of the present disclosure in the sub-scanning direction, taken along line C-C1 of FIG. 2.
Figure 5A:
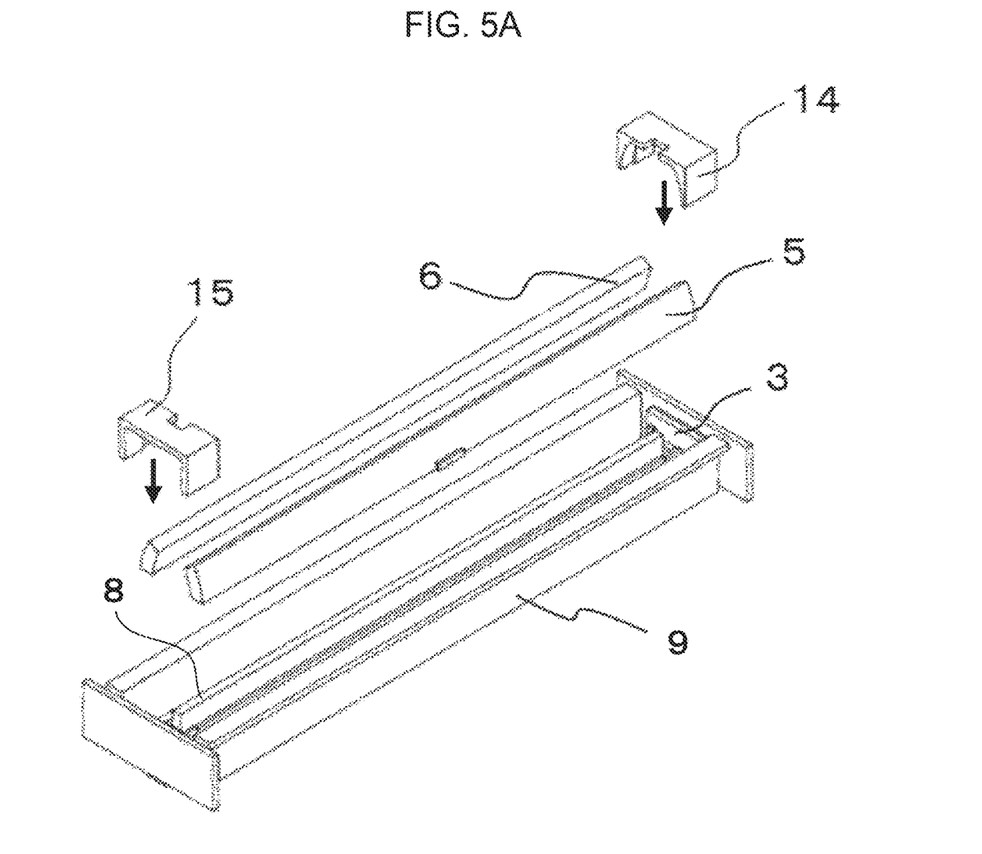
FIG. 5A is a perspective view according to Embodiment 1 of the present disclosure, illustrating a state before insertion of light guide holders into a housing.
Figure 5B:
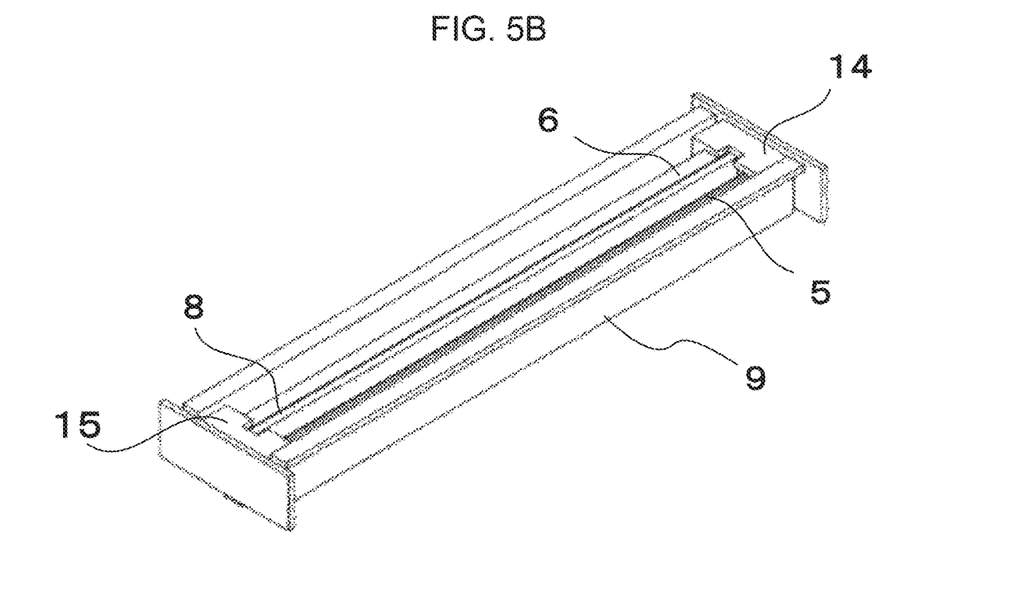
FIG. 5B is a perspective view according to Embodiment 1 of the present disclosure, illustrating a state after insertion of the light guide holders into the housing.

Here, the light guide holders 14 and 15, and the lens holders 11 and 12, are described with reference to FIGS. 4A, 4B, 5A, and 5B. As illustrated in FIG. 4A, the light guide holder 14 includes light guide holding parts 14a and 14b, and as illustrated in FIG. 4B, the light guide holder 15 includes light guide holding parts 15a and 15b. The light guide holding part 14a forms a hole or an open cut penetrating from an end surface side of the light guide 5 in the main scanning direction toward the light source 16. The light guide holding part 14b forms a hole or an open cut penetrating from an end surface side of the light guide 6 in the main scanning direction toward the light source 17. Similarly, the light guide holding part 15a forms a hole or an open cut penetrating from an end surface side of the light guide 5 in the main scanning direction toward the light source 18. The light guide holding part 15b forms a thorough-hole penetrating from an end surface of the light guide 6 in the main scanning direction toward the light source 19.

The lens holder 11 includes a holder bottom 11g, lens body holders 11e and 11f, a holder bottom protrusion 11c protruding outwardly in the sub-scanning direction from an intersection of the holder bottom 11g with the lens body holder 11e, and a holder bottom protrusion 11d protruding outwardly in the sub-scanning direction from an intersection of the holder bottom 11g with the lens body holder 11f. The lens holder 12 includes a holder bottom 12g, lens body holders 12e and 12f, a holder bottom protrusion 12c protruding outwardly in the sub-scanning direction from an intersection of the holder bottom 12g with the lens body holder 12e, and a holder bottom protrusion 12d protruding outwardly in the sub-scanning direction from an intersection of the holder bottom 12g with the lens body holder 12f. The lens body 8 is bonded, by use of a light shield 10 having, for example, an adhesion function, to and held by the lens body holders 11e and 11f and the lens body holders 12e and 12f.

A light guide positioner 11a is disposed at an outside surface of the lens body holder 11e with respect to the sub-scanning direction and at an inside surface of the holder bottom protrusion 11c with respect to the height direction. A light guide positioner 11b is disposed at an outside surface of the lens body holder 11f with respect to the sub-scanning direction and at an inside surface of the holder bottom protrusion 11d with respect to the height direction. A light guide positioner 12a is disposed at an outside surface of the lens body holder 12e with respect to the sub-scanning direction and at an inside surface of the holder bottom protrusion 12c with respect to the height direction. A light guide positioner 12b is disposed at an outside surface of the lens body holder 12f with respect to the sub-scanning direction and at an inside surface of the holder bottom protrusion 12d with respect to the height direction. A surface of each of the light guide positioners 11a and 11b that faces the light guides 5 and 6 to be attached has at least a portion having the same shape as a shape of a surface of facing surfaces of the light guides 5 and 6. Similarly, a surface of each of the light guide positioners 12a and 12b that faces the light guides 5 and 6 to be attached has at least a portion having the same shape as a shape of a surface of facing surfaces of the light guides 5 and 6. Although FIGS. 4A and 4B illustrate an example in which each of the light guide positioners 11a, 11b, 12a, and 12b is formed of two planar surfaces so as to match the shape of the light guides 5 and 6, this is not limiting, and each may be formed of, for example, one curved surface or a combination of a planar surface and a curved surface.

As illustrated in FIGS. 4A, 4B, 5A, and 5B, by insertion of the light guide holders 14 and 15 into the light guide 5 and the housing 9 from a document side in the height direction, the light guide 5 is held by the light guide holding parts 14a and 15a and is positioned by the light guide positioner 11a of the lens holder 11 and the light guide positioner 12a of the lens holder 12.

Similarly, by insertion of the light guide holders 14 and 15 into the light guide 6 and the housing 9 from the document side in the height direction, the light guide 6 is held by the light guide holding parts 14b and 15b and is positioned by the light guide positioner 11b of the lens holder 11 and the light guide positioner 12b of the lens holder 12.

A surface of each of the light guide holding parts 14a and 14b that faces the light guides 5 and 6 to be attached has at least a portion having the same shape as a shape of a surface of facing surfaces of the light guides 5 and 6. Similarly, a surface of each of the light guide holding parts 15a and 15b that faces the light guides 5 and 6 to be attached has at least a portion having the same shape as a shape of a surface of facing surfaces of the light guides 5 and 6.

That is to say, each of the light guides 5 and 6 is sandwiched between a corresponding light guide positioner of the light guide positioners 11a and 11b of the lens holder 11, a corresponding positioner of the light guide positioners 12a and 12b of the lens holder 12, a corresponding light guide holding part of the light guide holding parts 14a and 14b of the light guide holder 14, and a corresponding light guide holding part of the light guide holding parts 15a and 15b of the light guide holder 15, thereby determining height direction positions and sub-scanning direction positions of the light guides 5 and 6. The light guide positioners 11a, 12a, 11b, and 12b are examples of a first positioner.

As illustrated in FIGS. 4A and 4B, a board fixing member 25 fixes the sensor board 24 on the opposite surface of the housing 9 from the surface of the housing 9 facing the reading surface of the document M, and a transparent plate fixing member 26 fixes the transparent plate 1 to the housing 9. The transparent plate 1 need not be fixed to the image reading device 100, and is omittable if not necessary.

Figure 6A:
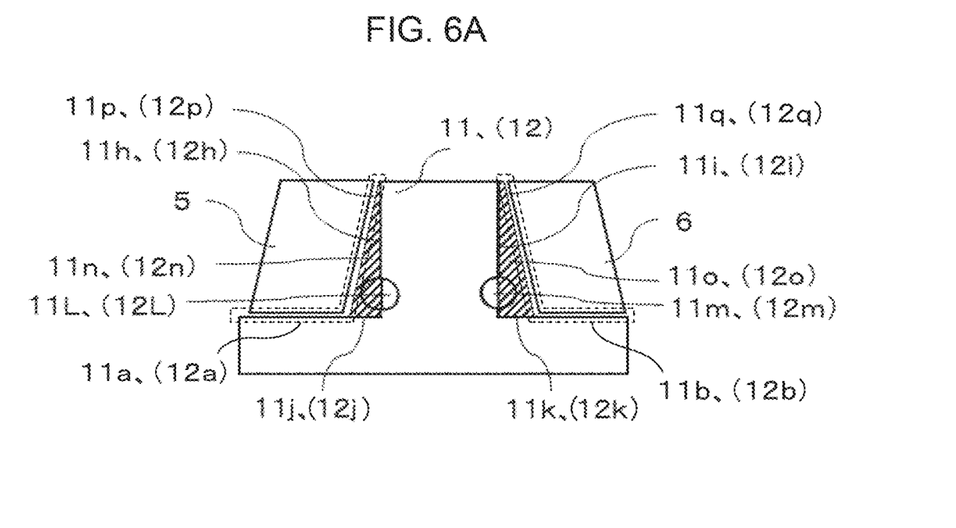
FIG. 6A is a plane view of the light guides and a lens holder according to Embodiment 1 of the present disclosure, as viewed from sides of the light sources in the main scanning direction.

Next, an optical filter 27 attached to the lens holder 11 and an optical filter 28 attached to the lens holder 12 are described with reference to FIGS. 6A and 6B. Each of the optical filters 27 and 28 is an optical filter, such as an infrared cut filter (IRCF), that blocks or attenuates light having a specific wavelength from light from a light source. The lens holder 11 and the lens holder 12 are similarly configured. In the explanation below, reference signs of structural elements included in the lens holder 12 and the optical filter 28 are indicated in parentheses. As illustrated in FIG. 6A, the lens holder 11 (12) includes optical filter side-surface positioners 11h (12h), 11i (12i) and optical filter bottom-surface positioners 11j (12j), 11k (12k). The optical filter side-surface positioner 11h (12h) is positioned more inside the lens holder 11 (12) than an edge 11p (12p) at the light source side of a surface of the light guide positioner 11a (12a) that extends in the height direction, and the optical filter side-surface positioner 11i (12i) is positioned more inside the lens holder 11 (12) than an edge 11q (12q) at the light source side of a surface of the light guide positioner 11a (12a) that extends in the height direction. That is to say, the optical filter side-surface positioner 11h (12h) is positioned on a surface of the lens holder 11 (12) facing the light source, at a position displaced from a position of the light guide positioner 11a (12a) along the sub-scanning direction on a side opposite to the light guide 5. The optical filter side-surface positioner 11i (12i) is positioned on a surface of the lens holder 11 (12) facing the light source, at a position displaced from a position of the light guide positioner 11b (12b) along the sub-scanning direction on a side opposite to the light guide 6.

Figure 6B:
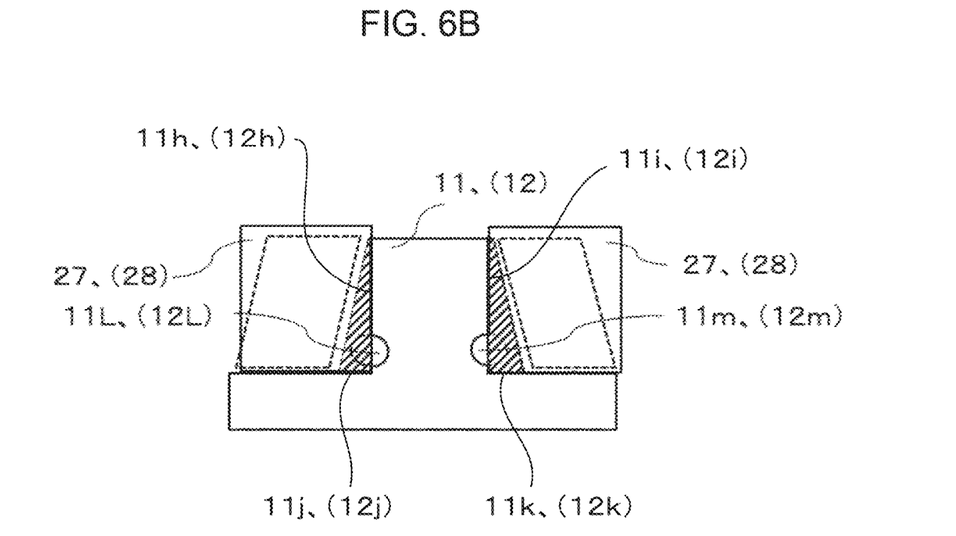
FIG. 6B is a plane view of the lens holder according to Embodiment 1 of the present disclosure to which the light guides and an optical filter is attached, as viewed from the sides of the light sources in the main scanning direction.

During bonding the optical filter 27 (28) to the lens holder 11 (12), two adjacent edges of a light transmitting surface of the optical filter 27 (28) are aligned with the optical filter side-surface positioners 11h (12h), 11i (12i) and the optical filter bottom-surface positioners 11j (12j), 11k (12k), and are attached to adhesive application areas 11n (12n), 11o (12o) marked with diagonal lines in FIGS. 6A and 6B. This fixedly positions the optical filter 27 (28) to the lens holder 11 (12) with respect to the light guides 5 and 6. The optical filter side-surface positioners 11h (12h), 11i (12i) determine a position of the optical filter 27 (28) in the sub-scanning direction, and the optical filter bottom-surface positioners 11j (12j), 11k (12k) determine a position of the optical filter 27 (28) in the height direction. The optical filter side-surface positioners 11h (12h), 11i (12i) and the optical filter bottom-surface positioners 11j (12j), 11k (12k) are examples of a second positioner.

The adhesive application area 11n (12n) is an area enclosed by the edge 11p (12p) at the light source side of a surface of the light guide positioner 11a (12a) that is disposed in the lens body holder 11e and extends in the height direction, the optical filter side-surface positioner 11h (12h), and the optical filter bottom-surface positioner 11j (12j), and the adhesive application area 11o (12o) is an area enclosed by the edge 11q (12q) at the light source side of a surface of the light guide positioner 11b (12b) that is disposed in the lens body holder 11f and extends in the height direction, the optical filter side-surface positioner 11i (12i), and the optical filter side-surface positioner 11h (12h), and the optical filter bottom-surface positioner 11k (12k). Hereinafter, the term "adhesive application area" is used to collectively refer to the adhesive application areas 11n (12n), 11o (12o), and the term "optical filter" is used to collectively refer to the optical filters 27 (28). The adhesive application area is an area in which the optical filter and the lens holder overlap in the main scanning direction. The adhesive application area has a bonding surface shape that is equivalent to a surface shape of the optical filter. The adhesive application areas 11n (12n), 11o (12o) are examples of a bonding surface.

That is to say, in FIGS. 6A and 6B, a surface in which the optical filter 27 (28) and the lens holder 11 (12) overlap in the main scanning direction serves as the bonding surface between the optical filter 27 (28) and the lens holder 11 (12).

Figure 7A:
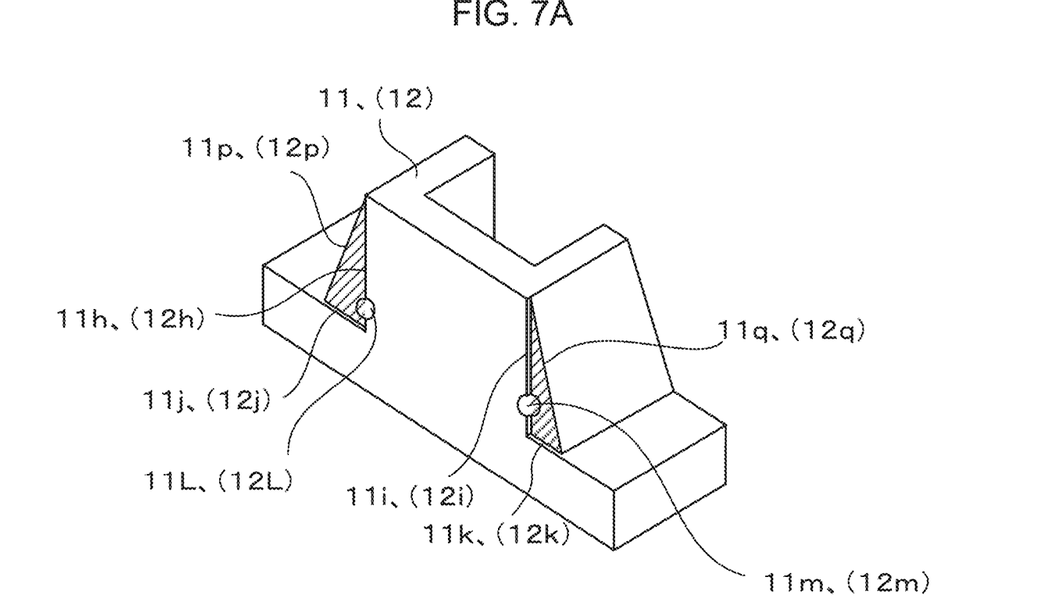
FIG. 7A is a perspective view of an example of the lens holder according to Embodiment 1 of the present disclosure.
Figure 7B:
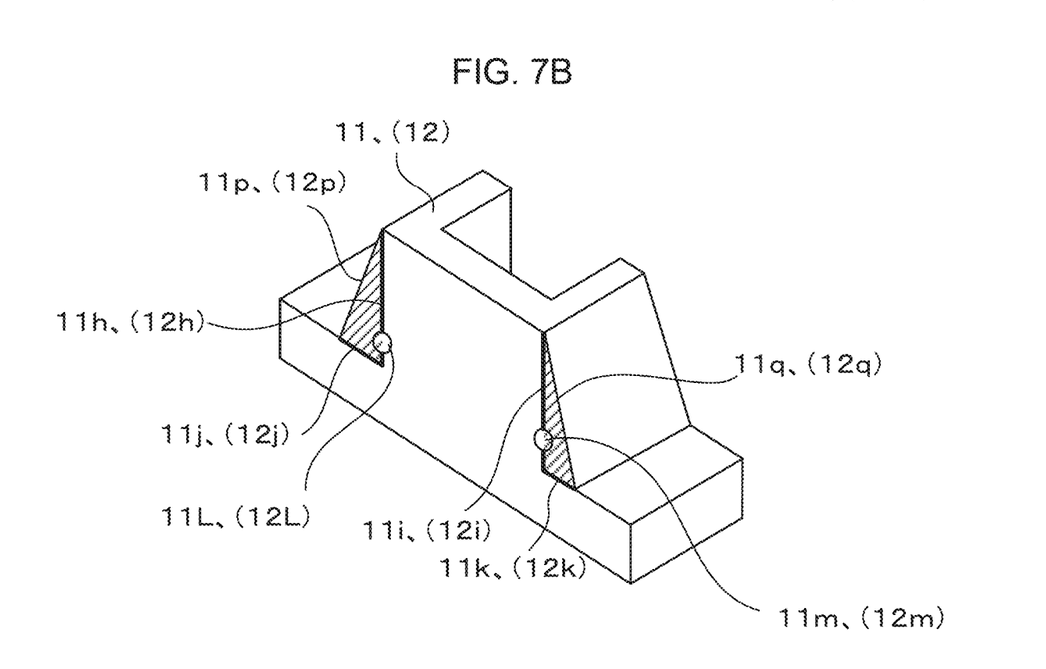
FIG. 7B a perspective view of another example of the lens holder according to Embodiment 1 of the present disclosure.

The optical filter side-surface positioners 11h (12h), 11i (12i) and the optical filter bottom-surface positioners 11j (12j), 11k (12k) are, for example, steps between the outmost surface at the light source side of the lens holder 11 (12) and the adhesive application areas 11n (12n), 11o (12o) located more inside in the main scanning direction than the outmost surface at the light source side, as illustrated in FIG. 7A. Alternatively, the optical filter side-surface positioners 11h (12h), 11i (12i) and the optical filter bottom-surface positioners 11j (12j), 11k (12k) may be lines drawn on the outmost surface at the light source side of the lens holder 11 (12), as illustrated in FIG. 7B.

In the examples of FIGS. 6A, 6B and FIGS. 7A, 7B, the optical filter side-surface positioners 11h (12h), 11i (12i) and the optical filter bottom-surface positioners 11j (12j), ilk (12k) are formed in straight lines. However, this is not limiting, and any shapes that match the shape of the light transmitting surface of the attached optical filter 27 (28), such as a curved line and a combination of a line and a curved line, may be employed.

For the light guides 5, 6, which are sandwiched and held by the light guide positioners 11a, 11b, 12a, 12b of the lens holders 11, 12 and by the light guide holding parts 14a, 15a of the light guide holders 14, 15 as illustrated in FIGS. 4A and 4B, and the optical filters 27, 28, which are positioned by the optical filter side-surface positioners 11h (12h), 11i (12i) and the optical filter bottom-surface positioners 11j (12j), 11k (12k) as illustrated in FIGS. 6A and 6B, the sub-scanning direction cross section centers of the light guides 5, 6 and the sub-scanning direction cross section centers of the optical filters 27, 28 are aligned in the sub-scanning direction and the height direction.

The aforementioned configuration enables a mechanism to highly accurately maintain a relative positional relationship between the optical filters 27, 28 bonded to the lens holders 11, 12 and the light guides 5, 6. Further, the aforementioned configuration reduces variance in positions of the light guides 5, 6 and the optical filters 27, 28, thereby eliminating the need for margin in the size of the optical filters 27, 28. This enables reduction in the sizes of the optical filters 27, 28 and also enables reduction in a size of the image reading device 100.

As illustrated in FIGS. 6A and 6B, the lens holder 11 includes concave-shaped excess adhesive escape mechanisms 11L, 11m, and the lens holder 12 includes concave-shaped excess adhesive escape mechanisms 12L, 12m. The excess adhesive escape mechanism 11L and excess adhesive escape mechanism 11m may be connected to each other. Similarly, the excess adhesive escape mechanism 12L and excess adhesive escape mechanism 12m may be connected to each other. Further, a plurality of the excess adhesive escape mechanisms 11L and a plurality of the excess adhesive escape mechanisms 12L may be arranged on the back surface of the lens holder.

The excess adhesive escape mechanisms 11L, 11m of the lens holder 11 extend over optical filter side-surface positioners 11h, 11i from the back surface of the lens holder 11, that is, from a surface facing the light source. The optical filter 27, during bonding of the optical filter 27 to the lens holder 11, extrudes excess of applied adhesive toward the excess adhesive escape mechanisms 11L, 11m. This prevents the adhesive from flowing toward the light guide.

Similarly, the excess adhesive escape mechanisms 12L, 12m of the lens holder 12 extend over optical filter side-surface positioners 12h, 12i from the back surface of the lens holder 12, that is, from a surface facing the light source. The optical filter 28, during bonding of the optical filter 28 to the lens holder 12, extrudes excess of applied adhesive toward the excess adhesive escape mechanisms 12L, 12m. This prevents the adhesive from flowing toward the light guide. The excess adhesive escape mechanisms 11L, 11m, 12L, 12m are examples of an excessive adhesive reservoir portion. The optical filter side-surface positioners 11h, 11i, 12h, 12i are examples of a portion for positioning the optical filter in the sub-scanning direction.

Each of the excess adhesive escape mechanisms 11L, 11m, 12L, 12m is taken to be a mechanism having a structure with a depth and a size that are sufficient for escape of excess of applied adhesive that varies depending on the adhesive used and other conditions. The excess adhesive escape mechanisms 11L, 11m may be arranged to penetrate the lens holder 11 in the sub-scanning direction. The excess adhesive escape mechanisms 12L, 12m may be arranged to penetrate the lens holder 12 in the sub-scanning direction. The excess adhesive escape mechanisms 11L, 11m, 12L, 12m are arranged at the boundaries of the adhesive application areas of the lens holders 11, 12 and have portions that extend from the optical filter side-surface positioners 11h, 11i, 12h, 12i beyond the bonding surfaces of the optical filters 27, 28 toward the inside. Thus, even when the excess of adhesive fills portions of the excess adhesive escape mechanisms 11L, 11m, 12L, 12m corresponding to bonding surfaces via which the optical filters 27, 28 are bonded to the lens holders 11, 12, that is, the portions arranged in the adhesive application areas, the adhesive is then guided to the portions extending beyond the bonding surfaces of the optical filters 27, 28. This prevents intrusion of the adhesive toward the light guides 5, 6.

In the example illustrated in FIGS. 6A and 6B, each of the excess adhesive escape mechanisms 11L, 11m, 12L, 12m has, at the back surface of a corresponding lens holder of the lens holders 11, 12, that is, at the surface thereof facing the corresponding light source, a circular concave opening. The excess adhesive escape mechanisms 11L, 11m, 12L, 12m are formed such that (i) semicircular portions thereof are arranged in the bonding surfaces via which the optical filters 27, 28 are bonded to the lens holders 11, 12, that is, in the adhesive application areas and (ii) the remaining semicircular portions extend beyond the bonding surfaces of the optical filters 27, 28. Hereinafter, the term "excess adhesive escape mechanism" is used to collectively refer to the excess adhesive escape mechanisms 11L, 11m, 12L, 12m.

Figure 8:
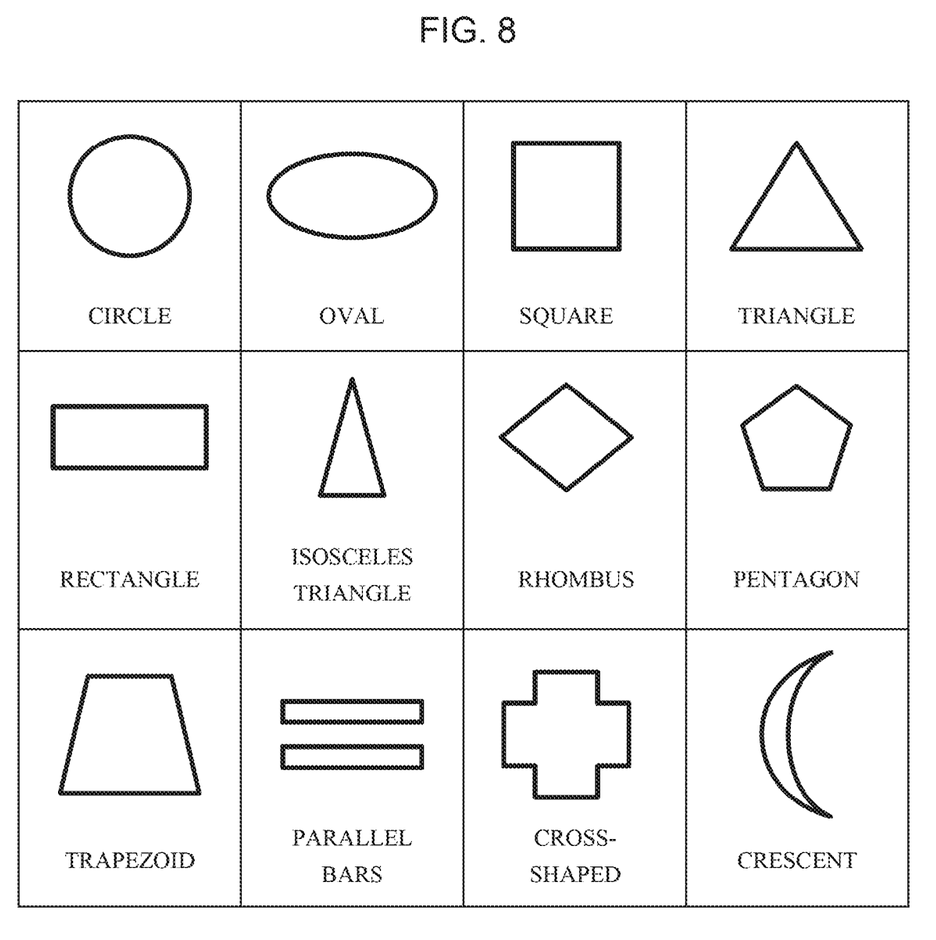
FIG. 8 illustrates other examples of a mechanism of an excessive adhesive reservoir portion of the lens holder according to Embodiment 1 of the present disclosure.

FIG. 8 illustrates other example shapes of the opening of the excess adhesive escape mechanism. The excess adhesive escape mechanism is not limited to being "circular", and the opening of the excess adhesive escape mechanism may have, depending on shapes of the light guide, the optical filter and the lens holder, another shape such as trigonal and polygonal shapes. Regardless of which of form illustrated in FIG. 8 is employed, the excess adhesive escape mechanism is formed such that (i) a portion thereof is arranged in the adhesive application areas and (ii) the remaining portion thereof extends beyond the bonding surfaces of the optical filters 27, 28 in the direction opposite to the light guides 5, 6.

The adhesive is applied to the adhesive application area 11n including a portion of the excess adhesive escape mechanism 11L of the lens holder 11 and to the adhesive application area 11o including a portion of the excess adhesive escape mechanism 11m of the lens holder 11. The adhesive is applied to the adhesive application area 12n including a portion of the excess adhesive escape mechanism 12L of the lens holder 12 and to the adhesive application area 12o including a portion of the excess adhesive escape mechanism 12m of the lens holder 12.

The optical filter 27 is, with reference to the optical filter side-surface positioners 11h, 11i and the optical filter bottom-surface positioners 11j, 11k, pressed against and attached to the adhesive application areas 11n, 11o of the lens holder 11. Similarly, the optical filter 28 is, with reference to the optical filter side-surface positioners 12h, 12i and the optical filter bottom-surface positioners 12j, 12k, pressed against and attached to the adhesive application areas 12n, 12o of the lens holder 12. During attachment, excess adhesive is extruded by the excess adhesive escape mechanisms 11L, 11m and the excess adhesive escape mechanisms 12L, 12m. This serves as a mechanism to prevent intrusion of the adhesive toward the light guide, that is, toward pathways of light from the light source to the end surface of the light guide.

As described above, setting an attachment position of the optical filter 27 with respect to the lens holder 11 maintains high accuracy in the a relative positional relationship between the optical filter 27 bonded to the lens holder 11 and the light guides 5, 6, and arrangement of the excess adhesive escape mechanisms 11L, 11m in the lens holder 11 enables stable bonding of the optical filter 27. The same applies to the lens holder 12 side. This achieves an image reading device with reduction in sizes of the optical filter, while preventing of excess of adhesive toward the light guide during bonding of the optical filter and achieving a high-quality image.

Although the image reading device 100 includes two light guides in the aforementioned embodiment, this is not limiting, and one light guide or three or more light guides may be employed.

Although an embodiment for achievement of both the first objective and the second objective is described above, the embodiment may be an embodiment for achievement of the first objective only or may be an embodiment for achievement of the second objective only. According to an embodiment for achievement of the first objective only, the lens holders 11, 12 do not include the excess adhesive escape mechanisms 11L, 11m, 12L, 12m. According to an embodiment for achievement of the second objective only, the lens holders 11, 12 do not include the optical filter side-surface positioners 11h, 11i, 12h, 12i and the optical filter bottom-surface positioners 11j, 11k, 12j, 12k.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to betaken in a limiting sense, and the scope of the invention is defined only by the included claims, along with the full range of equivalents to which such claims are entitled.

This application claims the benefit of Japanese Patent Application No. 2018-165610, filed on Sep. 5, 2018, the entire disclosure of which is incorporated by reference herein.

REFERENCE SIGNS LIST

M Document (Reading target)
100 Image reading device
1 Transparent plate
3, 4 Light source unit
5, 6 Light guide
7 Sensor unit
8 Lens body
9 Housing
10 Light shield
11, 12 Lens holder
11a, 11b, 12a, 12b Light guide positioner (First positioner)
11c, 11d, 12c, 12d Holder bottom protrusion
11e, 11f, 12e, 12f Lens body holder
11g, 12g Holder bottom
11h, 11i, 12h, 12i Optical filter side-surface positioner (Second positioner)
11j, 11k, 12j, 12k Optical filter bottom-surface positioner (Second positioner)
11L, 11m, 12L, 12m Excess adhesive escape mechanism (Excessive adhesive reservoir portion)

11n, 11o, 12n, 12o Adhesive application area (Bonding surface)
11p, 11q, 12p, 12q Edge
13 Light receiver
14, 15 Light guide holder
14a, 14b, 15a, 15b Light guide holding part
16, 17, 18, 19 Light source
20, 21 Light source board
22, 23 Heat conductor
24 Sensor board
25 Board fixing member
26 Transparent plate fixing member
27, 28 Optical filter

The invention claimed is:

1. An image reading device comprising:
a light guide extending in a main scanning direction and configured to emit light from a light source toward a reading target moving relatively in a sub-scanning direction, the light from the light source being projected into an end surface of the light guide in the main scanning direction;
an optical filter arranged between the light source and the end surface of the light guide in the main scanning direction and configured to block or attenuate light having a specific wavelength from the light from the light source;
a lens body to focus reflected light reflected by the reading target onto a light receiver to convert the reflected light into an electrical signal; and
a lens holder to hold the light guide, the optical filter, and the lens body, wherein
the lens holder includes (i) a first positioner for positioning the light guide in the sub-scanning direction and in a height direction that is orthogonal to the main scanning direction and the sub-scanning direction and (ii) a second positioner for positioning the optical filter in the height direction and the sub-scanning direction.

2. The image reading device according to claim 1, wherein
the second positioner is positioned on a surface of the lens holder facing the light source, at a position displaced from a position of the first positioner along the sub-scanning direction on a side opposite to a side on which the light guide is arranged,
the optical filter is, with reference to the second positioner, using an adhesive, bonded and fixed to a bonding surface arranged between the first positioner and the second positioner that are arranged on the surface of the lens holder facing the light source, and
a concave-shaped excessive adhesive reservoir portion is disposed at a boundary of the bonding surface such that (i) a portion of the excessive adhesive reservoir portion is arranged in the bonding surface and (ii) a remaining portion of the excessive adhesive reservoir portion extends beyond the bonding surface along the sub-scanning direction and in a direction opposite to the side on which the light guide is arranged.

3. The image reading device according to claim 2, wherein the excessive adhesive reservoir portion extends over a portion of the second positioner for positioning the optical filter in the sub-scanning direction.

4. The image reading device according to claim 3, further comprising:
the light source arranged to face the end surface of the light guide in the main scanning direction; and
the light receiver arranged along the main scanning direction and configured to convert the reflected light focused by the lens body into an electrical signal.

5. The image reading device according to claim 2, wherein the excessive adhesive reservoir portion has a circular opening.

6. The image reading device according to claim 5, further comprising:
the light source arranged to face the end surface of the light guide in the main scanning direction; and
the light receiver arranged along the main scanning direction and configured to convert the reflected light focused by the lens body into an electrical signal.

7. The image reading device according to claim 2, further comprising:
the light source arranged to face the end surface of the light guide in the main scanning direction; and
the light receiver arranged along the main scanning direction and configured to convert the reflected light focused by the lens body into an electrical signal.

8. The image reading device according to claim 1, wherein a surface of the first positioner that faces the light guide has at least a portion having a same shape as a shape of a surface of the light guide that faces the surface of the first positioner.

9. The image reading device according to claim 8, further comprising:
the light source arranged to face the end surface of the light guide in the main scanning direction; and
the light receiver arranged along the main scanning direction and configured to convert the reflected light focused by the lens body into an electrical signal.

10. The image reading device according to claim 1, wherein, for the light guide positioned by the first positioner and the optical filter positioned by the second positioner, a center of a cross section of the light guide in the sub-scanning direction and a center of a cross section of the optical filter in the sub-scanning direction are aligned in the sub-scanning direction and the height direction.

11. The image reading device according to claim 10, further comprising:
the light source arranged to face the end surface of the light guide in the main scanning direction; and
the light receiver arranged along the main scanning direction and configured to convert the reflected light focused by the lens body into an electrical signal.

12. The image reading device according to claim 1, further comprising:
the light source arranged to face the end surface of the light guide in the main scanning direction; and
the light receiver arranged along the main scanning direction and configured to convert the reflected light focused by the lens body into an electrical signal.

* * * * *